UNITED STATES PATENT OFFICE.

CHARLES J. THATCHER, OF NEW YORK, N. Y.

PROCESS FOR UTILIZING WASTE LIQUOR.

1,405,954.　　Specification of Letters Patent.　　Patented Feb. 7, 1922.

No Drawing.　　Application filed January 24, 1920. Serial No. 353,741.

*To all whom it may concern:*

Be it known that I, CHARLES J. THATCHER, a citizen of the United States, and a resident of 27 West 95th St., city of New York, in the county of New York and State of New York, have invented certain new and useful Improvements in the Processes for Utilizing Waste Liquor, of which the following is a specification.

The invention relates to a process for utilizing waste liquor, such as spent or partly spent oxidizing or reducing liquors, by regenerating the same and using them in subsequent operations under conditions which obviate the necessity for evaporation or concentration of such liquors.

I will take as an example the treatment of spent chrome liquors, such as result from the oxidation of anthracene to anthraquinone or similar organic oxidation processes. It will be understood, however, that the process, which constitutes this invention, may likewise be applied to other liquors of this or similar nature, whether they be derived from oxidation or reduction or similar processes.

In the manufacture of anthraquinone, for example by oxidation of anthracene with a dilute sulphuric acid solution of sodium bichromate, it has been found that the spent chrome liquors can be economically and practically regenerated by electrolytic oxidation, (provided suitable conditions are maintained) at the anode of a properly designed cell. An example of such a procedure is furnished by the U. S. Patent No. 630612 granted August 8th, 1899 to Le Blanc and Reisenegger.

In utilizing the regenerated chrome liquors produced by the process of this patent, it has heretofore been necessary to evaporate the liquors, either after, or usually before, they are electrolytically regenerated. This has been due to the fact, that, in order to oxidize the anthracene slowly and therefore without burning up the organic substance by too far reaching oxidation, the practice has been to mix up the anthracene with twenty or more times its weight of water before adding the regenerated, chromic-acid oxidizing solution. Since this oxidizing solution is added slowly, during the course of twelve hours or more, the previous addition of such a large volume of water insures that the anthracene is at all times subjected to a very dilute oxidizing mixture, and therefore that there is no breaking down or burning up of the anthracene.

Such addition of a large volume of water, however, increases by just that amount, the volume of the resulting spent chrome liquors. Consequently, after each oxidizing operation the said amount of water must be evaporated off, either before or after electrolytic oxidation, in order to restore the regenerated liquor to its original concentration and make it possible to add again the necessary quantity of water for dilution during each subsequent oxidation of the anthracene.

Such evaporation of a large quantity of water from the very corrosive chromic acid solutions require expensive evaporators of special design and is costly in time and fuel. Moreover, any salts or other dissolved substances, contained in each added portion of water, remain in this solution and accumulate therein, and may produce disturbances in the electrolytic and oxidizing processes. I have found that these, and other disadvantages which might be mentioned, are overcome by the following procedure, which constitutes my invention.

At the start, the oxidation of the anthracene may be carried out with a suitable chromic acid mixture, such as a sulphuric acid solution of sodium or other bichromate, and in the usual manner, filtering off the resulting anthraquinone from the spent liquors as is customary. Preferably, this filtration is effected before the liquid (which will be at a temperature of approximately 100° C.) has cooled down to any appreciable degree. The purpose of this is to conserve the heat stored up in these liquors as much as possible; but it is not essential that the filtration be effected while they are hot, and if found desirable, the liquors containing the suspended anthraquinone, can be filtered at any desired temperature.

Instead of evaporating the resulting filtrate, consisting for the most part of sodium and chromium sulphates and usually some excess of sulphuric acid, this filtrate, in accordance with my invention is separated into two portions. One of the portions of suitable volume is regenerated as by electrolytic oxidation; but any other means of regenerating such a spent oxidizing (or also a reducing) solution can be used. To the other portion which, as above stated may still be hot, there is then added the anthracene which is properly mixed therein by stirring. This portion of the spent chrome liquors, therefore, takes the place of the water hitherto added, and acts in its place as a suitable dilutant, since all of the bichromate has been substantially exhausted by the previous operation. The dissolved salts, such as chromium sulphate, in this portion of the spent liquors have no oxidizing effect whatsoever and are practically inert. This portion of the liquor, moreover, can, as above stated, be still very hot, so that it is not necessary to use time or fuel to bring it up to 75° C. or more before starting the oxidation as has been necessary in the previous practice. This, of course, is one item of economy in my process.

To the suspension of the anthracene in this portion of spent liquors, at a suitable temperature, there is then added the regenerated portion, or a regenerated portion from some other prior operation, the same being preferably added slowly and with stirring just as in the former practice of this process, and in a quantity sufficient to substantially complete the oxidation. If required, the necessary heat is furnished in any well-known manner. The result is that the entire oxidation is at all times carried out, as before, in a dilute chromic acid oxidizing solution but that no water has been added which needs to be evaporated. The chromium and sodium sulphates content of the dilutant portion, insures that the concentration of the spent liquors from the second cycle of operations is precisely the same as that from the first cycle. Thereupon, the anthraquinone is filtered off, as is customary, from the spent liquors.

The latter liquors are similarly divided into two portions after each operation, and used, as above described, over and over again and with the result that neither dilution nor evaporation is necessary. Since the liquors come from the regenerating cells hot, and can be added to a suspension of anthracene in hot spent chrome liquors, a very small quantity of fuel indeed is needed to bring them up to 95° C. to 100° C., which is a suitable temperature for effective oxidation.

It will be obvious, therefore, that this procedure is advantageous in the respects above mentioned, and others which will be appreciated by those skilled in this art; and it will be understood that the process may be suitably modified to meet any varied conditions of operation. It will also be understood that spent reducing liquors can be similarly regenerated and used over again, without dilution and subsequent evaporation, by the same or a similar procedure as that above described.

In using the word "spent" herein it will be understood that I refer to liquors which are either entirely or partly spent.

I claim:

1. The process of utilizing spent liquors from previous operations, which comprises adding a substance to be transformed to a suitable portion of spent liquor from a previous operation, regenerating a further portion of the spent liquor and adding same to the mixture of spent liquor and substance to be transformed.

2. The process of oxidizing with spent liquors from previous operations, which comprises adding a substance to be oxidized to a suitable portion of spent liquor from a previous operation, oxidizing a further portion of the spent liquor and adding same to the mixture of spent liquor and substance to be oxidized.

3. The process of oxidizing anthracene to anthraquinone with a solution containing chromic acid, which comprises adding anthracene to a suitable portion of spent chrome liquor from a previous operation, regenerating a further portion of said liquor and adding the same to the mixture of anthracene and spent liquor to oxidize the anthracene.

4. The process of oxidizing anthracene to anthraquinone with a solution containing chromic acid, which comprises adding anthracene to a suitable portion of spent chrome liquor from a previous operation, regenerating a further portion of said liquor, adding the same to the mixture of anthracene and spent liquor to oxidize the anthracene, separating the anthraquinone from the spent liquor and reserving a portion of the latter for the next operation.

5. The process of oxidizing anthracene to anthraquinone with an acid solution of a bichromate, which comprises adding anthracene to a suitable portion of spent bichromate liquor from a previous operation, oxidizing a further portion of the spent liquor and adding the same slowly and with stirring to the anthracene in suspension and in greater than the moleculai quantity necessary to completely oxidize the anthracene.

6. The process of oxidizing anthracene to anthraquinone with an acid solution of a bichromate, which comprises adding anthracene to a suitable portion of spent bichromate liquor from a previous operation, oxidizing a further portion of the spent liquor, adding the same slowly and with stirring to the anthracene in suspension and in quantities sufficient to substantially complete the oxidation, filtering off the anthraquinone and reserving a portion of the spent liquor for the next operation.

7. The process of utilizing spent liquors from previous operations, which comprises adding a substance to be transformed to a suitable portion of spent liquor from a previous operation, regenerating the transforming substance of a further portion of the spent liquor and adding a solution of said substance to the mixture of spent liquor and substance to be transformed.

8. The process of oxidizing anthracene to anthraquinone with a solution containing chromic acid, which comprises adding anthracene to a suitable portion of spent chrome liquor from a previous operation, oxidizing the chromium compounds of a further portion of said liquor and adding a solution of the oxidized compounds to the mixture of anthracene and spent liquor to oxidize the anthracene.

Signed at New York in the county of New York and State of New York this 23rd day of January A. D. 1920.

CHARLES J. THATCHER.